Dec. 13, 1938.   W. S. MERKLE   2,140,137
METHOD AND MEANS FOR WINDING COILS
Filed June 21, 1935   4 Sheets-Sheet 2

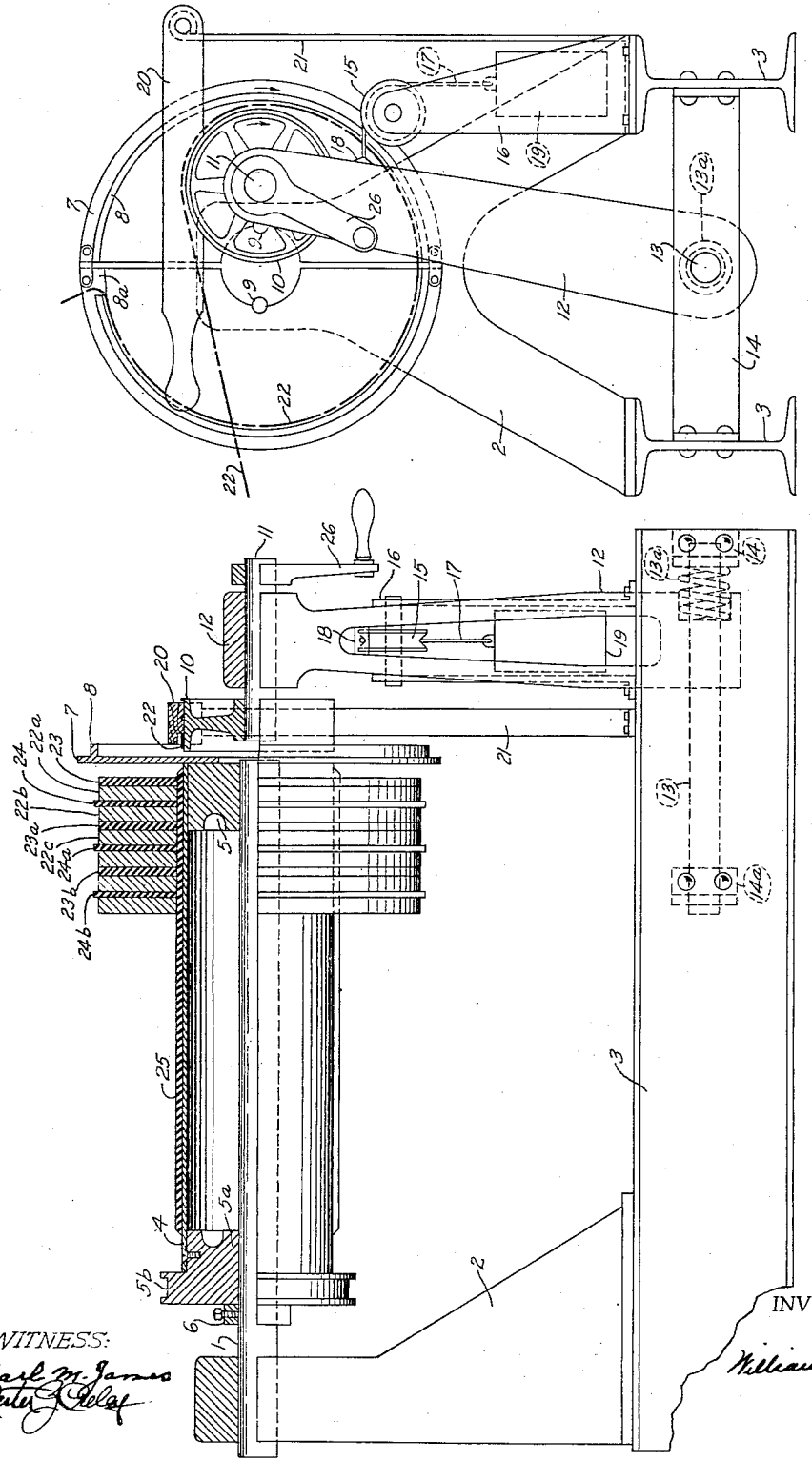

WITNESS:
Earl M. James
Lester J. Croley

INVENTOR.
William S. Merkle

Dec. 13, 1938.                W. S. MERKLE                 2,140,137
                    METHOD AND MEANS FOR WINDING COILS
                         Filed June 21, 1935          4 Sheets-Sheet 3
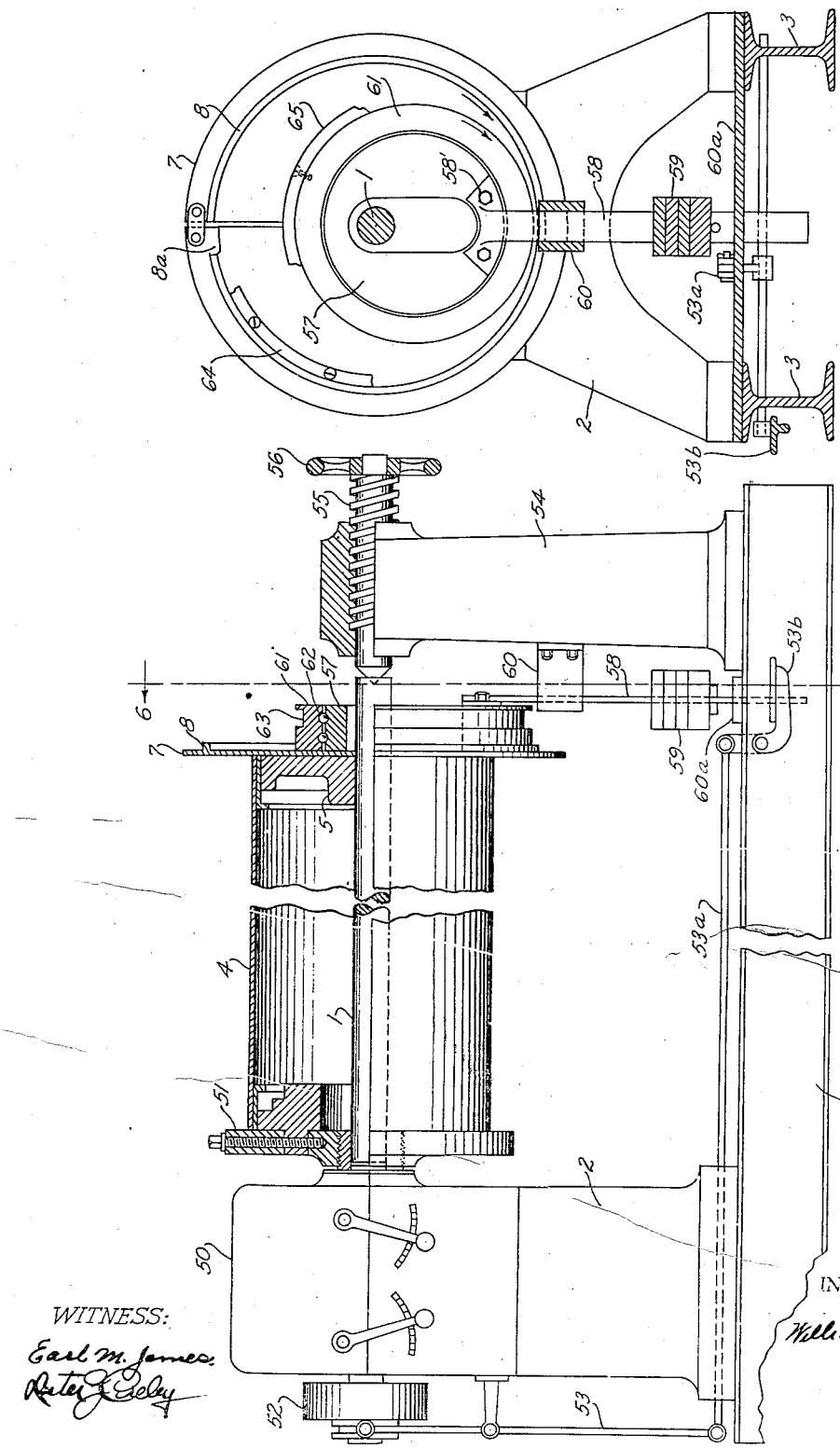
WITNESS:
INVENTOR.
William S. Merkle Patented Dec. 13, 1938

2,140,137

UNITED STATES PATENT OFFICE 2,140,137

METHOD AND MEANS FOR WINDING COILS

William S. Merkle, St. Louis, Mo.

Application June 21, 1935, Serial No. 27,623

24 Claims. (Cl. 140—92.2)

My invention relates to coil winding machines, more particularly to the class of machines for winding annular coils of wire for transformer and other electrical purposes.

In transformers, especially of the larger sizes designed for the higher voltages, in which a high degree of insulation and free circulation of cooling medium is a requisite, the windings are usually built up by stacking a plurality of flat annular or disklike coils of insulated wire, properly spaced and serially connected to create a unidirectional series winding consisting of a plurality of such coils in the formation of the transformer winding leg or stack.

The common method of building such transformer winding leg or stack involves much tedious labor and uncertainty in the quality of the finished product. The usual procedure involves numerous operations, as,—first the coils are wound separately or in pairs,—next the coils are stacked with insulating spacers to the requirements of the transformer,—and finally the coils are jointed serially by soldering or brazing. Usually a large number of such coils are so built up into a leg or unit, involving substantially a like number of such soldered or brazed joints. The multiplicity of such joints between the coils, where the working space is usually very limited, calls for great care and skilled workmanship, and always entails a risk of transformer failures.

The advantages of eliminating fabricated or "made-up" joints between coils in transformers and other electrical apparatus have long been recognized, and means have heretofore been devised for winding a series of annular coils with a continuous wire so as to avoid the necessity of joining separately wound coils. Such means have not, however, proven commercially successful because their operation has been too complicated and cumbersome, and usually entailed additional costs.

My invention contemplates winding the coils directly from a stock reel, and fabricating a finished stack of coils with insulating rings and spacers therebetween. This is done by progressive operations on a winding lathe or machine.

An object of my invention is to provide an improved method and means for winding a continuous series of coils suitable for use in transformers or other apparatus where a series of coils is used.

Another object of my invention is to provide means for transferring and for carrying wound coils during the process of winding successive coils without interrupting the continuity of the wire.

Another object of my invention is to provide a machine for fabricating a complete unit such as a stack or leg winding, consisting of a series of flat annular spirally wound coils, so that the coils may be closely associated face to face or so that the coils may be spaced with insulating rings or spacer blocks in progressive order.

Numerous additional objects and advantages of my invention will appear from the following detailed description and accompanying drawings.

For the purpose of illustrating and describing my invention I have illustrated and described only several of the preferred forms of my invention, it being obvious from the following description that various other types and combinations of parts not shown will function equally as well.

In the drawings:

Fig. 1 is a side elevation, partly in section, showing an embodiment of my invention in a machine of simple construction. Fig. 2 is an end view of Fig. 1.

Fig. 5 is a side elevation, partly in section, which shows a form of my invention embodied in a winding lathe of conventional form. Fig. 6 is a vertical sectional view along line 6—6 of Fig. 5.

In all the drawings the same numerals are used to denote similar parts.

Figure 4:
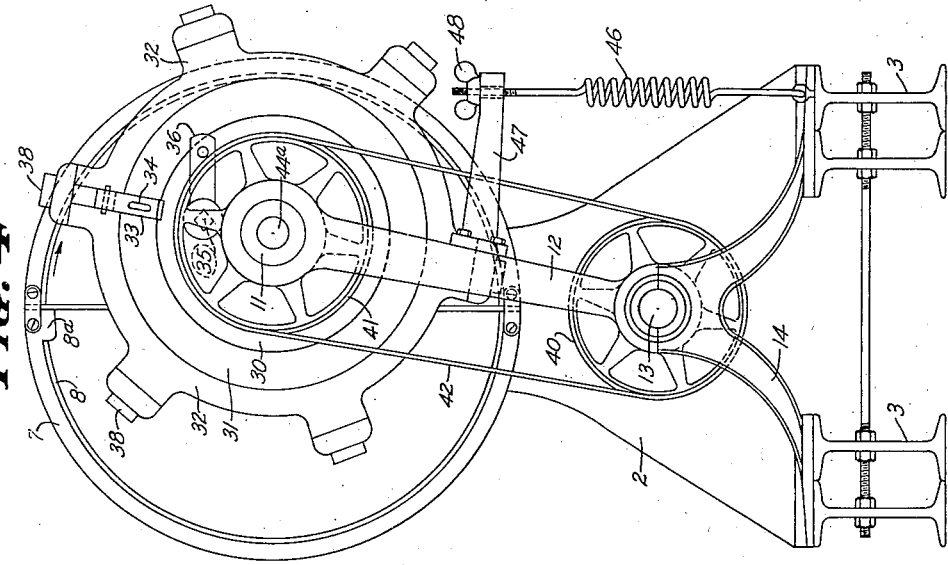
Fig. 4 is an end view of Fig. 3.

One form of a simple hand-operated type of my invention is shown in Figs. 1 and 2 where the numeral 1 indicates a shaft supported by pedestal 2 resting on a base 3. 4 is a coil-carrying member which may be a drum as shown, mounted on spiders 5 and 5a. 6 is a collar fixed on shaft 1. 7 is a split disk with its sections hinged and latched together and removably secured to the spider 5a by grips or buttons 9. The disk 7 could be secured to the drum instead of the spider if desired. Shaft 1 terminates in spider 5. 8 is a restraining ring or member which may consist of several sections secured to the face of the disk 7. 10 is a wheel supported on shaft 11 and is arranged to operate close to the face of the disk 7 and within the ring 8. The swinging arm 12 is pivoted at 13 and supports the shaft 11. A spring 13a may be used to force the swinging arm in the direction of the disk 7 and thus maintain wheel 10 close to the face of disk 7. Crank 26 serves to rotate wheel 10. A cord 17 passing over pulley 15 is secured to the swinging arm at the clevis 18. A weight 19 is secured to the other end of the cord to cause the wheel to bear against the restraining ring 8. The pedestal 16 supports pulley 15. A lever 20 pivoted to spring member 21 acts as a guide for the wire during the coil-winding operation. Rotation of the crank 26 will cause the drum and restraining member to rotate because of friction between the wheel 10 and restraining member 8. An auxiliary means for rotating the drum is provided by pulley 5b.

A stack of transformer coils may be wound on this device by winding one coil from the outside inwardly, the next one from the inside out, the next from the outside in again, and so forth. It is obvious that the first coil of the stack may be wound either from the outside inwardly or from the inside outwardly. To wind the first coil from the outside inwardly, one end of a wire 22 is hooked in the slot 8a as shown in Fig. 2. As the handle 26 is rotated in the direction indicated by the arrows, the restraining member will rotate in the same direction and the wire will be wound within the restraining member from the outside inwardly. The size of the weight 19 will, of course, determine the pressure with which the wheel 10 bears against the wire between the wheel and the restraining member and may be adjusted to give the most satisfactory operating pressure. As the coil is wound, it can be seen that the axis of the wheel 10 will approach the axis of the drum 4. When the axes coincide, the winding of the coil must, of course, stop. A flat or rectangular wire has been found to provide a better shaped and more rigid coil than round wire. The lever 20 serves to guide the wire during the winding operation.

Figure 3:
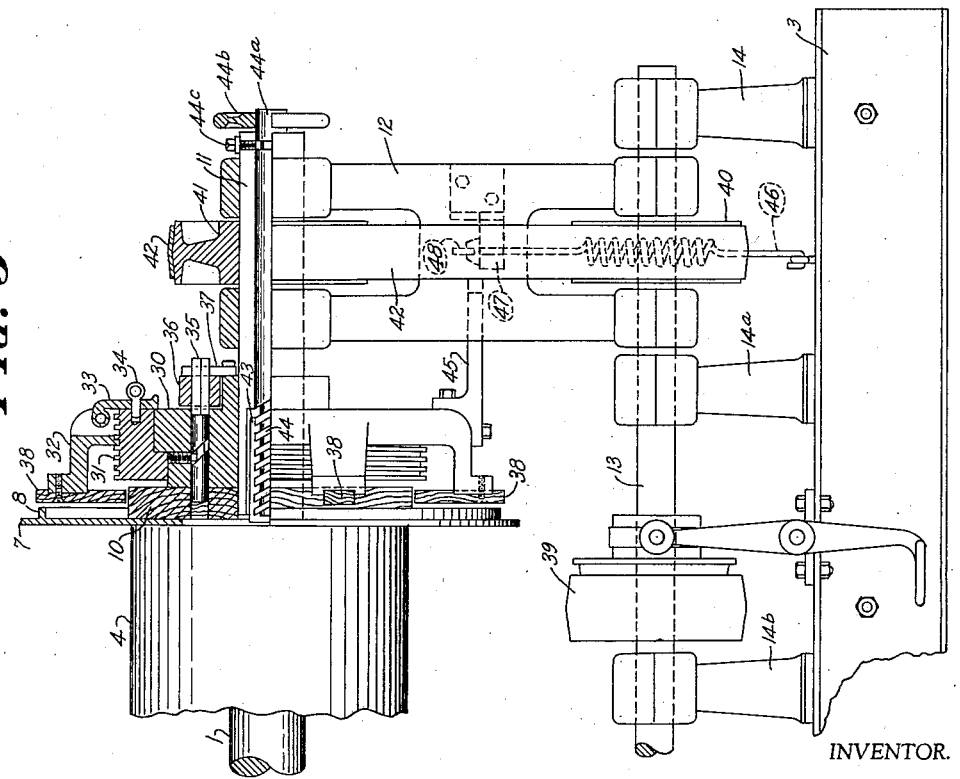
Fig. 3 is a side elevation, partly in section, showing an embodiment of the invention provided with means for transferring the wound coils from the winding element to a carrier element or drum.

The next coil may be wound on the wheel 10 from the inside outwardly in the same direction as the first coil. This is done by coupling the wheel 10 or its shaft 11 to the drum 4 or disk 7 so that the axis of the wheel will coincide with that of the drum 4. Any suitable locking means such as a screw 44, as shown in Fig. 3, or a locking pin, may be used. The inside end of the first coil is then provided with a lateral offset which leads over to the position of the new coil on wheel 10. Then if the wheel 10 is rotated, another coil may be wound on the wheel adjacent the first coil but from the inside out.

The two coils being thus wound, disk 7 may be removed from its position on drum 4, and they can be shifted from wheel 10 to the carrier drum 4, by pushing them bodily from the wheel to the carrier drum. The ends of the coils should preferably be "tied-in" to prevent unraveling during the shifting process and thereafter.

Disk 7 is then replaced in its winding position on drum 4, an offset bent laterally in the winding wire and passed through opening 8a in ring 8. Lever 20 is restored to its position on wheel 10. The wire is now in position so that the third coil in the series may be wound from the outside inwardly in the same manner as the first coil. This cycle of operations may be continued to complete a series of whatever number of coils are desired for the transformer leg. Insulation and spacers such as paper disks may be inserted between coils if and as required. These should preferably be inserted during the process of shifting wound coils from the winding element to the carrier drum. In Figs. 1 and 2 the finished coils are indicated by numerals 22a, 22b, and 22c. 23, 23a, and 23b indicate insulating spacers which are not solid disks but which have channels for cooling fluid flow between the coils. 24, 24a, and 24b indicate insulating disks used for separating paired coils. The arrangement of spacers, coils, and disks may, of course, be varied at will. The coils may be wound on spines or an insulating core 25 if desired.

It is obvious, of course, that the first coil could be shifted to the carrier drum before the second coil is wound. The second coil could then be wound from the inside outwardly directly on the carrier drum 4 adjacent the first coil. Following this the next coil may be wound in the same manner as the first coil by again using the restraining member 8 and wheel 10, and the next in the series would again be wound from inside outwardly directly on drum 4. The process may be continued progressively to the completion of the number of coils desired in the series. This latter method has some advantages over the first described method in that it requires shifting only alternate coils from the winding wheel to the carrier drum, thus simplifying the work of inserting insulating rings and spacers.

In Figs. 3 and 4, I show a coil-winding machine embodying a winding means and a carrier means similar to that shown in Figs. 1 and 2, but adapted for power drive, and provided with mechanical means for removing or shifting the wound coils from the winding element to the carrier drum.

Referring to Figs. 3 and 4 where the same numerals are used to designate parts already described in connection with Figs. 1 and 2: 41 indicates a pulley attached to shaft 11 and driven by belt 42 from pulley 40 on jack-shaft 13. 14, 14a, and 14b are pedestal bearings. A driving pulley 39 may be mounted on shaft 13 and controlled by a clutch. Other methods of driving the wheel 10 such as an individual motor geared to drive shaft 11, could, of course, be used. Means for reversing the direction of rotation are useful for operating the coil-shifting mechanism illustrated in Figs. 3 and 4, and for winding coils in the opposite direction. In Fig. 4 of the drawings, the machine appears adjusted for right-hand or clockwise rotation, the inner winding element being biased resiliently to the right, and supply wire feeding into the machine from the left-hand side. For left-hand or counter-clockwise winding process, it is only necessary to dispose the inner winding element to the left instead of the right, reverse the direction of rotation, and feed the wire from the right-hand side.

The coil shifting means shown in Figs. 3 and 4 may be explained as follows: 30 is a hub attached to and rotatable with, shaft 11. The rim of this hub may be used as a journal for an associated ring 31 which may be spirally grooved or threaded on its outer face. 32 is an outer ring spirally grooved or threaded to screw over ring 31. Fingers 38 secured to ring 32 serve as guides for training the wire into alignment for winding coils, and also protect the wound coils against side slipping. Flat segments of a disk or a flat disk with a radial slot for the winding wire may be used instead of the fingers 38 if desired. Numeral 45 represents an arm having one end bolted to the ring 32 and the other end or shank arranged to slide in a guide socket in moving arm 12. Thus ring 32 is movable in a direction parallel to the axis, but cannot rotate.

The winding wheel 10 in Fig. 3 normally floats as an idle wheel on shaft 11 but bolt 35, provided with a worm groove and engaging pin and an operating lever 36, provides a locking means between hub 30 and winding wheel 10. Thus wheel 10 may be made to rotate with shaft 11 when lever 36 is turned downward as shown in Fig. 4, or freed for rotation independent of the shaft by turning lever 36 upward. Lever 36 may be locked in this upward position by inserting pin 34 in ring 31. 33 is a hasp or latch hinged to the outer ring 32 which, in conjunction with the pin 34, locks members 31 and 32 when it is in the downward position as shown in Figs. 3 and 4.

The head of carrier drum 4, or the spider 5 may be provided at its center with a rectangular or irregular-shaped hole, adapted to receive a slug or dog 43 for the purpose of interlocking drum 4 with shaft 11. Shaft 11 is slotted at its end to guide dog 43. Screw 44 with its stem 44a and hand-wheel 44b are restrained for linear movement in the hollow part of shaft 11, by means of a collar or pin 44c. The dog 43 has an inside thread cooperative with thread 44 on stem 44a. Thus dog 43 can be moved into and out of engagement with the drum 4 by means of hand-wheel 44b. 46 is a loading spring which may have one end anchored on the base of the machine and the other end adjustably attached to an arm 47 projecting from arm 12. Spring 46 serves substantially the same purpose as the loading weight 19 illustrated in Figs. 1 and 2.

In its operation the device illustrated in Figs. 3 and 4 will function essentially the same as that described in Figs. 1 and 2. In this embodiment, however, the shifting of wound coils from the winding means to the drum or carrier element is performed mechanically.

First a coil is wound from outside inwardly. To do this the machine should be adjusted as shown in Figs. 3 and 4, viz, dog 43 should be withdrawn. Members 31 and 32 should be interlocked by means of latch 33 and pin 34. Since member 32 is restrained by arm 45, these members cannot rotate. Bolt 35 should be placed in inward position to lock the winding wheel 10 to hub 30. Since the hub 30 is keyed to shaft 11, the hub 30 and winding wheel 10 will rotate when shaft 11 is rotated. Carrier drum 4 will be rotated with wheel 10 due to frictional contact between it and ring 8. The wire is started in the slot 8a and a coil is completely wound by procedure as followed in connection with Figs. 1 and 2. Disk 7 is then removed so that the wound coil on wheel 10 may be cleared for shifting it to carrier drum 4. Member 31 is then unlocked from member 32 by withdrawing pin 34, and swinging latch 33 upward. At the same time winding wheel 10 is unlocked from hub 30 by withdrawing bolt 35, by turning lever 36 upward. With lever 36 in this position, hub 30 and member 31 can be interlocked by means of pin 34. In this adjustment, shaft 11, hub 30, and member 31 rotate as a unit and member 32 will screw forward to press the wound coil from wheel 10 to carrier drum 4. At the same time, coils already on the carrier drum will be driven farther ahead. The coils may be driven far enough ahead on drum 4 to provide space for winding the next successive coil from inside outwardly directly upon the carrier drum.

It may be observed that while the machine is adjusted for coil shifting, the wheel 10 and the drum 4 remain stationary, since they are disengaged from the revolving mechanism. After the wound coil is moved to the carrier drum 4, reverse motion is applied to the shaft 11 and the member 32 will be screwed back in position for the winding process.

To adjust the machine for winding the next coil from inside outwardly, directly on the drum and adjacent the last wound coil, drum 4 is locked to shaft 11 by means of dog 43, member 31 is unlocked from hub 30, and members 31 and 32 are locked together by means of latch 33. At the same time wheel 10 is locked to hub 30. With this adjustment, drum 4 will revolve with the shaft 11 for winding a coil from inside outwardly on drum 4.

To put the machine in its original position for winding a coil like the first from the outside inwardly, disengage shaft 11 from drum 4 by withdrawing dog 43, and replace disk 7 to its position on the end of drum 4. Then make the proper adjustment of spring 46. This sequence of operations may be so continued to the completion of a full series of coils without breaking continuity of the winding material.

Some transformers constructed with a series of flat annular or disk-shaped coils are built with the coils in close stacked formation. In other types, more particularly in transformers of high voltage characteristics, the adjacent coils are separated by means of insulating rings and radially fixed insulating blocks or spacers which form ducts between adjacent coils for the flow of oil or other cooling medium. My invention is adapted for either type of construction, for coils may be shifted to the coil carrier drum in a closely compressed formation, or the stack may be formed or assembled on the carrier drum with the coils in spaced relation, by inserting or affixing conventional insulating rings and spacers as each coil is wound or shifted to the carrier drum.

Figs. 5 and 6 of the drawings show another form of my invention embodied in a power winding machine or lathe of conventional type, in which 50 is a housing containing an arrangement of variable speed gearing, provided with a load clutch 51, and a driving clutch 52, with linked levers 53, 53a, and 53b. These parts with pedestal 2, base frame 3, and out-board pedestal 54 and tail-stock, constitute a common form of lathe. The shaft 1 is supported at its outer end on tail-stock center bolt 55 and at its other end in clutch 51. This shaft may be associated with clutch 51 to cause it to either rotate with the clutch or remain stationary while the clutch revolves. The carrier drum 4 is supported by clutch 51 at one end and by spider 5 at the other end. 57 is a disk or ring disposed adjacent to and in a plane parallel with disk 7. Ring 61 is rotatably supported on disk 57 as by parallel rows of ball bearings 62 in concentric grooves. 58 is a downward projecting stem fixed rigidly to disk 57 as by bolts 58, loaded by weight 59 and sliding in guides 60 and 60a. Shaft 1 projects through a vertical slot in disk 57 as shown.

Since the inside dimension of the restraining ring 8 controls the outside dimension of the coil to be wound, and the outside dimension of ring 61 controls the inside dimension of the coil to be wound, it follows that these parts must be altered to accommodate the dimensions of the coil desired. In order to avoid the necessity of changing the restraining ring 8 and inside ring or wheel 61 for each change in coil dimension, I prefer to provide for a range of coil dimensions by inserting fillers 64 and lagging 65. Such fillers and lagging can be made of wood, leather, or other material easily shaped, and may be attached by means of screws or bolts.

Such auxiliaries as guiding means for the winding material and means for shifting the coils from the winding element to the carrier element have been omitted from the drawings of the modification shown in Figs. 5 and 6 since it is obvious that means for guiding the winding material and for shifting the coils, similar to those illustrated and described in connection with Figs. 1, 2, 3, and 4 may likewise be applied to this type of device.

To obtain tightness in an inwardly wound coil, it is essential that the winding ring 61 travel at a peripheral speed at least equal to, and preferably in excess of, the speed of the winding material, and I therefore provide a groove 63 in the winding ring 61 for application of a small belt which may bring power from an auxiliary motor, or from an interconnection with the main drive of the machine.

The process of winding coils in the machine illustrated in Figs. 5 and 6 is precisely the same as described in connection with Figs. 1, 2, 3, and 4, but in its operation the inner winding element 57—61 moves resiliently in a vertical plane, while the similar parts in Figs. 1, 2, 3, and 4 move in an approximately horizontal plane.

Figure 7:
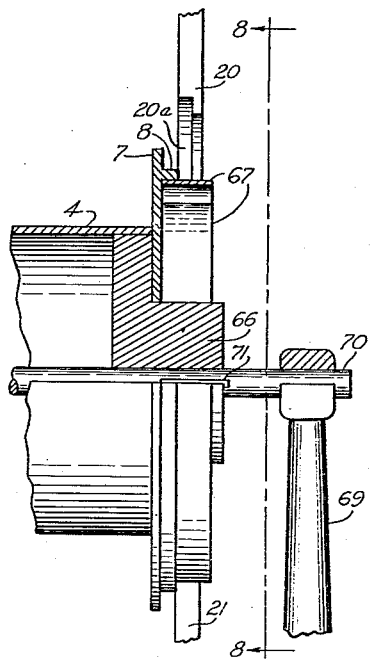
Fig. 7 is a side elevation, partly in section, illustrating an embodiment of my invention with an optional form of inner winding element.
Figure 8:
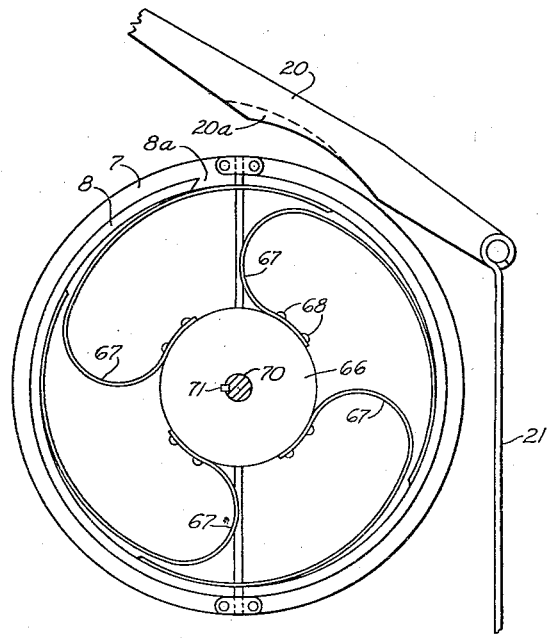
Fig. 8 is a cross sectional view along line 8—8 of Fig. 7.

In Figs. 7 and 8 I show another form of my invention in which the coil carrier and the associated outer restraining form are substantially similar to that shown in Figs. 1 to 6. In this embodiment of my invention I substitute an inner winding member utilizing resilient members to bear against the restraining member. The inner winding member is rotatably associated on the same axis with the coil carrier element and the restraining member. Thus in this embodiment of the invention, the inner winding member is not shifted axially relative to the outer restraining ring. In these figures hub 66 supports drum 4 and is fixed to shaft 70 by key 71. 69 is a bearing support for shaft 70. Numerals 67 indicate resilient members which may be attached at one end to hub 66, as by bolts 68 and free at the other end to creep within the restraining ring 8. 20 is a guide member for disposing the winding material through its undercut passage 20a into coil-winding alignment. The restraining member 8 may be made slightly less in width than the winding material. The resilient members 67 should be of sufficient width to provide riding surface for the guide lever 20 which may have its inner side spaced from the face of disk 7, a distance equal to the width of the winding material. The inner edges of the resilient members 67 should be spaced close to the disk 7.

In operation an end of the winding wire is hooked into the eye 8a of the restraining ring. The entire unit consisting of drum 4, disk 7, its restraining member 8, and the inner winding element as a whole are caused to revolve by means of shaft 70. A downward pressure on lever 20 tends to slightly flatten the resilient members as they pass thereunder, leaving space through which the winding material is drawn into formation of an inwardly wound coil. In thus winding a coil inwardly the free end of the resilient members 67 of the inner winding element creep forward and are compressed.

On completion of the inwardly wound coil the winding wire or material may be bent to form a lateral offset and the next coil may be wound from the inside out, in a plane parallel to and adjacent the first coil by utilizing the compressed inner member as a mandrel. The process of shifting wound coils from the winding elements to the carrier element and other features of the winding device may be substantially the same as described in connection with the other embodiments.

It is obvious that the principle described in connection with Figs. 7 and 8 may be applied to the other forms of the invention if desired. A plurality of compression springs or similarly responding resilient means, radially disposed like spokes from a central hub and outwardly restrained by a coil form, could be used instead of the particular type of resilient members here shown if desired.

Figure 9:
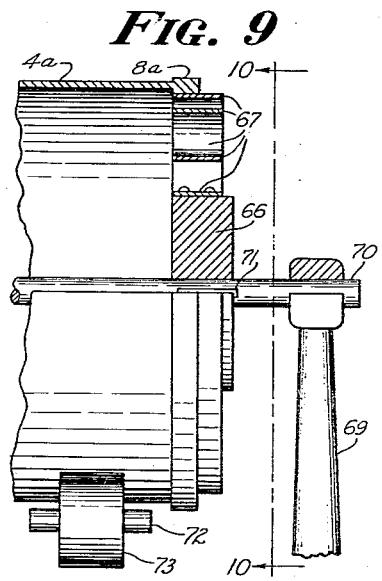
Fig. 9 is a side elevation, partly in section, illustrating an embodiment of my invention utilizing another form of inner winding element and an optional method of carrying the wound coils.
Figure 10:
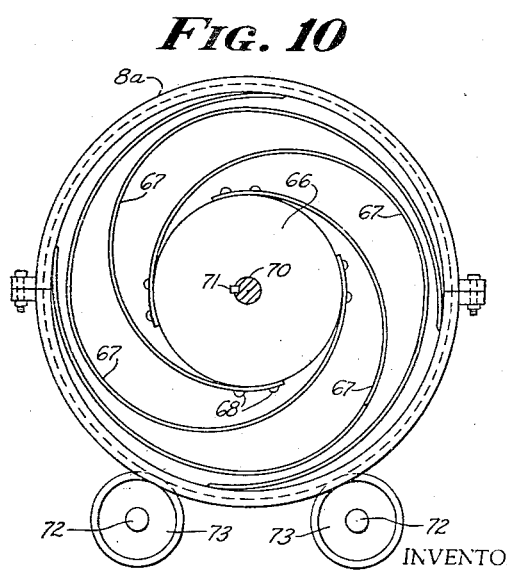
Fig. 10 is a view along line 10—10 of Fig. 9.

In Figs. 9 and 10 an embodiment of my invention is shown in which the carrier element is constructed to carry the wound coils within, instead of around its periphery. With such construction the end of the carrier element is used as an outer coil form. In Figs. 9 and 10 numeral 4a is a carrier element mounted for rotation with shaft 70. Rollers 73 mounted on spindles 72 offer a means for supporting the outer end of carrier element 4a. The carrier element 4a may be constructed in any suitable form as a hollow drum having a solid peripheral body or with a ribbed body to form a crib or cage. The interior of said carrier element should be of such dimension and shape as to allow the wound coils to be moved longitudinally therein. The open end of the carrier element 4a may be used as an outer coil form for winding a coil therein but I prefer providing a reinforcing band 8a attached at the end of said carrier element. The carrier element may be constructed in split form as indicated in Fig. 10 of the drawings to afford a convenient means for removing the wound coils. In the winding machine illustrated in Figs. 9 and 10 the process of winding coils from inside outwardly and from outside inwardly, and shifting the wound coils from the winding elements to the carrier element is substantially the same as that described in connection with the other embodiments except that the wound coils are shifted to the interior of the coil carrier element without necessitating removal of the outer coil form.

In Figs. 9 and 10 the inner winding element is the same as that shown in Figs. 7 and 8 with the resilient winding members 67 mounted for increased flexibility. It is obvious that the various inner winding elements shown in the various figures may be interchanged.

It can be seen that by changing the structural form of the outer restraining element 8 and the carrier element 4 to conform to the form of coil desired, spirally wound coils of many different shapes may be produced.

While I have illustrated and described only several embodiments of my invention, it will become apparent to those skilled in the art that various modifications, omissions, additions, and substitutions can be made in the devices shown and described without departing from the spirit and scope of the invention as defined by the appended claims.

What I claim as new and desire to secure by Letters Patent of the United States of America, is:—

1. A device for winding coils from outside inwardly, consisting of two rotatable members disposed one within the other in substantially the same plane, and a resilient means adapted to cooperate with the inner member and expand a winding material into a spirally formed annular coil within the outer member.

2. Means for winding a wire for forming an annular coil spirally inwardly, including an outer restraining member, an inner revolving member disposed for mutual rotation with said outer restraining member, said outer member being provided with an inner run-way, and said inner member being constructed to resiliently impinge upon said inner run-way for coiling a wire therebetween.

3. A device for winding annular coils, consisting of an outer element, and an inner winding element rotatively disposed in the same plane, and on the same shaft with said outer element, said inner winding element consisting of a hub member and resilient outward bearing members.

4. In a machine for winding a series of coils alternately from outside inwardly and from inside outwardly, a revolvable coil carrier, an outer member for winding within it, a co-acting member rotatable in the same plane, and within said outer member, said members being radially moveable relative to each other.

5. In a machine for winding a series of coils, a revolvable coil carrier, an outer member for winding within it, and a radially co-acting member rotatable in substantially the same plane and within said outer member, said members being resiliently disposed relative to each other.

6. A machine for winding a series of annular coils with a continuous wire in uni-directional stream, embodying means for winding alternate coils forming such series, from outside inwardly and from inside outwardly, and a hollow coil carrier means rotatably associated with said winding means, said coil carrier means being adapted to carry wound coils within it.

7. A machine for winding two flat annular coils, constituting a cycle in the process of winding a series of coils in the formation of a transformer leg, with a continuous wire, the successive coils being wound in face to face relation, one coil in each pair of coils being wound inwardly, and the other coil in each pair of coils being wound outwardly, means for forming an off-set bend at the finishing point of the inside turn of said first coil, and means for bending laterally the outside finishing end of the said second coil with off-set for beginning the next successive winding cycle in the process of forming a transformer leg, comprising a revolvable carrier element, a coil winding means consisting of an outer member associated with said carrier member, and an inner member operable in the same plane with said outer member, said members adapted to move relative to each other in the same plane, for winding an annular coil from outside inwardly, means for interlocking said inner member axially with said carrier member so that said inner member may be utilized as a mandrel for winding thereon the said second coil in a pair of coils, from inside outwardly, and means for shifting such coils from said winding means to the carrier member, and means for repeating the cycle of operation.

8. A machine for winding a pair of coils constituting a winding cycle in the process of winding a series of coils for the formation of a transformer winding unit, the successive coils being wound in parallel planes relative to each other, one coil in each pair of coils being wound inwardly, and the other coil being wound outwardly, the series uni-directional winding interconnecting adjacent coils being by means of off-setting bends progressively from inside turn to inside turn, and from outside turn to outside turn, means for winding one coil in each cycle inwardly, means for shifting such inwardly wound coil to an associated coil carrier member, said carrier member being adapted as a mandrel for outwardly winding the other coil in such pair of coils, and means for inserting insulating barriers and spacers.

9. A coil winding machine for winding a correlated series of coils, comprising a coil carrier adapted for winding coils outwardly thereon, an inwardly winding means consisting of an outer element and an inner winding element, including wire aligning guide means, means for shifting the inwardly wound coils from the winding means to the carrier means, and means for spacing adjacent coils so that insulating material may be inserted between adjacent coils.

10. A coil winding machine for winding a series of annular coils for an electrical unit, with a continuous wire, a revolvable coil carrier supported by a shaft, a member associated with said coil carrier, said member constituting an outer form for inwardly winding a coil therein, a winding element disposed in the same plane and within said outer form member, means for rotating said winding element, means for mutual rotation of said outer form member and its associated coil carrier with said winding element, means for winding a next successive coil outwardly upon said winding element, and means for shifting wound coils to the carrier element.

11. A coil winding machine for winding a series of annular coils in uni-directional relation for an electrical unit, with a continuous wire, a coil carrier supported by a shaft, a member removably attached to said coil carrier, said member constituting an outer form for inwardly winding a coil therein, a winding element disposed in the same plane with said outer form member, means for rotating said coil carrier with its associated outer form, means for mutual rotation of said winding member, means for interlocking said winding element with said coil carrier and its associated outer form for winding a next successive coil outwardly on said winding element, means for control of the material flow in the process of winding coils, and means for shifting wound coils to the coil carrier.

12. Means for building a transformer winding consisting of a series of flat annular coils in stacked relation, and for unidirectional current flow, by process of winding alternate coils from the outside inwardly, and from the inside outwardly, with a continuous wire imposed with off-set bend at departure of each coil for beginning the next successive coil winding, an element for within winding an inwardly winding coil, rotatably associated with a carrier drum or element, means for guiding the inflow wire to winding alignment, means for transferring the inwardly wound coils to said carrier drum or element, and means employing said carrier drum or element as a mandrel for winding thereon the alternate coils from inside outwardly.

13. In a coil-winding device, an outside revolvable restraining form, an inner winding member revolving in substantially the same plane but within said outer form and means to vary the distance between the inner winding member and the outer restraining form.

14. In a coil-winding device, an outer rotating restraining form, a wheel within said restraining form and means to move the wheel from the edge of the restraining form to the center of the restraining form.

15. In means for producing a coil, an inner member rotating within an outer rotating member, said inner member and outer member supported in a common plane on separate and relatively parallel shafts, and means for moving said shafts into and out of a common center.

16. In a coil-winding device, an outer revolvable coil form and an expansible inner member within said outer coil form adapted to form a coil by inwardly winding within said outer coil form.

17. In a machine for winding a series of coils with a continuous wire, a coil-winding means, a rotating coil carrying means, and means to transfer the connected serially wound coils from the winding means to the carrying means.

18. In a coil-winding device, a coil-winding means, a rotating coil carrier, a removable restraining member between the coil-winding means and the rotating coil carrier, there being a space between the coil-winding means and the rotating coil carrier to allow the insertion of spacing means between adjoining coils when the restraining member is removed.

19. In a device for winding coils, an inner revolving element, an outer revolving coil form, said inner element being disposed within said outer coil form, and means to move the inner element laterally within said outer coil form, and outwardly bearing resilient means on said inner element to form a winding within the outer coil form.

20. In a coil-winding device, a winding means, a rotating carrier, a removable restraining member between said winding means and rotating carrier and means for transferring wound coils from the winding means to the carrier.

21. In a transformer coil-winding machine, means to wind a series of flat, connected coils in stacked formation, an associated rotating coil carrier and means to transfer wound coils to the carrier, said carrier rotating with the coil-winding means so that new coils may be wound with a continuation of the wire from the wound coils.

22. In a machine for winding a series of transformer coils in stacked formation, a coil-winding means, an associated rotating carrier, said carrier rotating with the winding means so that the coils may be transferred from the winding means to the carrier and means whereby to insert spacing elements between adjacent coils during the transfer of the coils.

23. In a machine for winding a series of coils with a continuous wire, a coil-winding means, a coil carrier and means to transfer wound coils to the carrier in stacked formation, said carrier rotating with the coil-winding means so that new coils may be wound with a continuation of the wire from the wound coils.

24. The hereinbefore described method of winding a series of connected, flat spiral coils which consists in winding a coil from the outside inwardly, transferring said coil from the coil-winding device to a rotating carrier, winding the next coil from the inside outwardly, the next again from the outside inwardly and continuing these operations until the desired number of connected coils is produced.

WILLIAM S. MERKLE.